US008009193B2

United States Patent
Zhou et al.

(10) Patent No.: US 8,009,193 B2
(45) Date of Patent: Aug. 30, 2011

(54) UNUSUAL EVENT DETECTION VIA COLLABORATIVE VIDEO MINING

(75) Inventors: Hanning Zhou, Palo Alto, CA (US); Don Kimber, Foster City, CA (US); Lynn Wilcox, Palo Alto, CA (US)

(73) Assignee: Fuji Xerox Co., Ltd., Tokyo (JP)

( * ) Notice: Subject to any disclaimer, the term of this patent is extended or adjusted under 35 U.S.C. 154(b) by 1486 days.

(21) Appl. No.: 11/446,893

(22) Filed: Jun. 5, 2006

(65) Prior Publication Data

US 2007/0279490 A1    Dec. 6, 2007

(51) Int. Cl.
*H04N 7/12* (2006.01)

(52) U.S. Cl. ........ 348/143; 348/159; 348/161; 382/103; 382/107; 382/115; 382/159

(58) Field of Classification Search ................... 348/143, 348/156, 159, 161; 382/103, 107, 115, 159
See application file for complete search history.

(56) References Cited

U.S. PATENT DOCUMENTS

| | | | | |
|---|---|---|---|---|
| 5,091,780 A | | 2/1992 | Pomerleau | 358/108 |
| 6,028,626 A | * | 2/2000 | Aviv | 348/152 |
| 7,296,231 B2 | * | 11/2007 | Loui et al. | 715/723 |
| 7,302,451 B2 | * | 11/2007 | Radhakrishnan et al. | 1/1 |
| 7,821,870 B2 | * | 10/2010 | Ramakrishnan | 367/93 |

OTHER PUBLICATIONS

Bobick, A.F. et al., A State-Based Approach to the Representation and Recognition of Gesture, *IEEE Transactions on Pattern Analysis and Machine Intelligence*, vol. 19, No. 12, Dec. 1997, pp. 1325-1337.

Brand, M. et al., Discovery and Segmentation of Activities in Video, *IEEE Transactions on Pattern Analysis and Machine Intelligence*, vol. 22, No. 8, Aug. 2000, pp. 844-851.

Brémond, F. et al., Scenario Recognition in Airborne Video Imagery, *Proc. Int. Workshop Interpretation of Visual Motion*, Mar. 1998, pp. 57-64.

Buxton, H., Learning and Understanding Dynamic Scene Activity: A Review, *Image and Vision Computing*, 21(1), 2003, pp. 125-136.

Hongeng, S., Unsupervised Learning of Multi-Object Event Classes. *Proc. British Machine Vision Conference*, 2004.

Oliver, N.M. et al., A Bayesian Computer Vision System for Modeling Human Interactions, *IEEE Transactions on Pattern Analysis and Machine Intelligence*, 22(8), 2000, pp. 831-843.

(Continued)

*Primary Examiner* — Jayanti K. Patel
*Assistant Examiner* — Geepy Pe
(74) *Attorney, Agent, or Firm* — Morgan, Lewis & Bockius LLP

(57) ABSTRACT

Embodiments of the present invention describe a collaborative framework for mining of surveillance videos to detect abnormal events, which introduces a two-stage training process to alleviate the high false alarm problem. In the first stage, unsupervised clustering is performed on the segments of the video streams and a set of abnormal events are combined with user feedback to generate a clean training set. In the second stage, the clean training set is used to train a more precise model for the analysis of normal events and the motion detection results from multiple cameras can be cross validated and combined. This description is not intended to be a complete description of, or limit the scope of, the invention. Other features, aspects, and objects of the invention can be obtained from a review of the specification, the figures, and the claims.

20 Claims, 4 Drawing Sheets

OTHER PUBLICATIONS

Zhang, D. et al., Semi-Supervised Adapted HMMs for Unusual Event Detection, *Proc. IEEE Conf. On Computer Vision and Pattern Recognition*, vol. 1, Jul. 2005.

Zhong, H. et al., Detecting Unusual Activity in Video, *Proc. IEEE Conf On Computer Vision and Pattern Recognition*, vol. 2, Washington, D.C., Jul. 2004, pp. 819-826.

* cited by examiner

UNUSUAL EVENT DETECTION VIA COLLABORATIVE VIDEO MINING

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

This invention relates to the field of video monitoring and analysis.

2. Description of the Related Art

In response to heightened security demand, more and more video surveillance systems are deployed. However, the number of trained personnel for watching the systems are too limited to monitor all of them effectively, let alone to analyze the vast amount of data collected from the video surveillance systems offline. Thus, automatic mining and detection of abnormal events is necessary, and it can be generally formulated as a classification of time series. A supervised approach to event detection and recognition learns a model of reference event sequences from training samples and then devises a matching criterion such that they can accommodate variations within one event class while discriminating between different event classes. Dynamic Time Warping (DTW), a matching technique widely used for speech recognition, has been used in recognizing human motion pattern. Finite-state machine (FSM) is also used for modeling vehicle motion from aerial images. One common assumption of those supervised approaches is that the events of interest are known in advance and can be modeled accordingly. To detect unusual events which are not seen before, unsupervised and semi-supervised approaches are necessary. The performance of such approaches depends on the number of iterations, which has to be manually set case by case, causing high occurrences of false alarm.

Abnormal events that are of interests to surveillance application can be characterized by its rarity (seldom occurs) and unexpectedness (unseen before). The rarity of abnormal events limits the number of training data for such events. Although each suspicious (abnormal) activity before a major attack may not be enough to trigger an alarm if considered individually, it will be much more obvious that some abnormal event is going to happen if the evidences from distant sites are combined. Meanwhile, the distinctions between two abnormal events are usually as large as that between an abnormal event and a normal event, making it hard to train a model for a general abnormal event. On the other hand, there exist abundant training data for normal events, and those normal events tend to cluster in a few regions.

SUMMARY OF THE INVENTION

Various embodiments of the present invention describes a collaborative framework for mining of surveillance videos to detect abnormal events, where the problem is formulated as a binary classification problem. The framework introduces a two-stage training process to alleviate the high false alarm problem of mining of abnormal events in surveillance videos. In the first stage, unsupervised clustering is performed on the segments of the video streams and set of abnormal events are combined with user feedback to generate a clean training set. In the second stage, the clean training set is used to train a more precise model for the analysis of abnormal events and the motion detection results from multiple cameras can be cross validated and combined.

BRIEF DESCRIPTION OF THE DRAWINGS

Certain embodiments of the present invention will be described in detail on the following figures, wherein.

DETAILED DESCRIPTION OF THE INVENTION

The invention is illustrated by way of example and not by way of limitation in the figures of the accompanying drawings in which like references indicate similar elements. It should be noted that references to "an" or "one" or "some" embodiment(s) in this closure are not necessarily to the same embodiment, and such references mean at least one.

Figure 1:
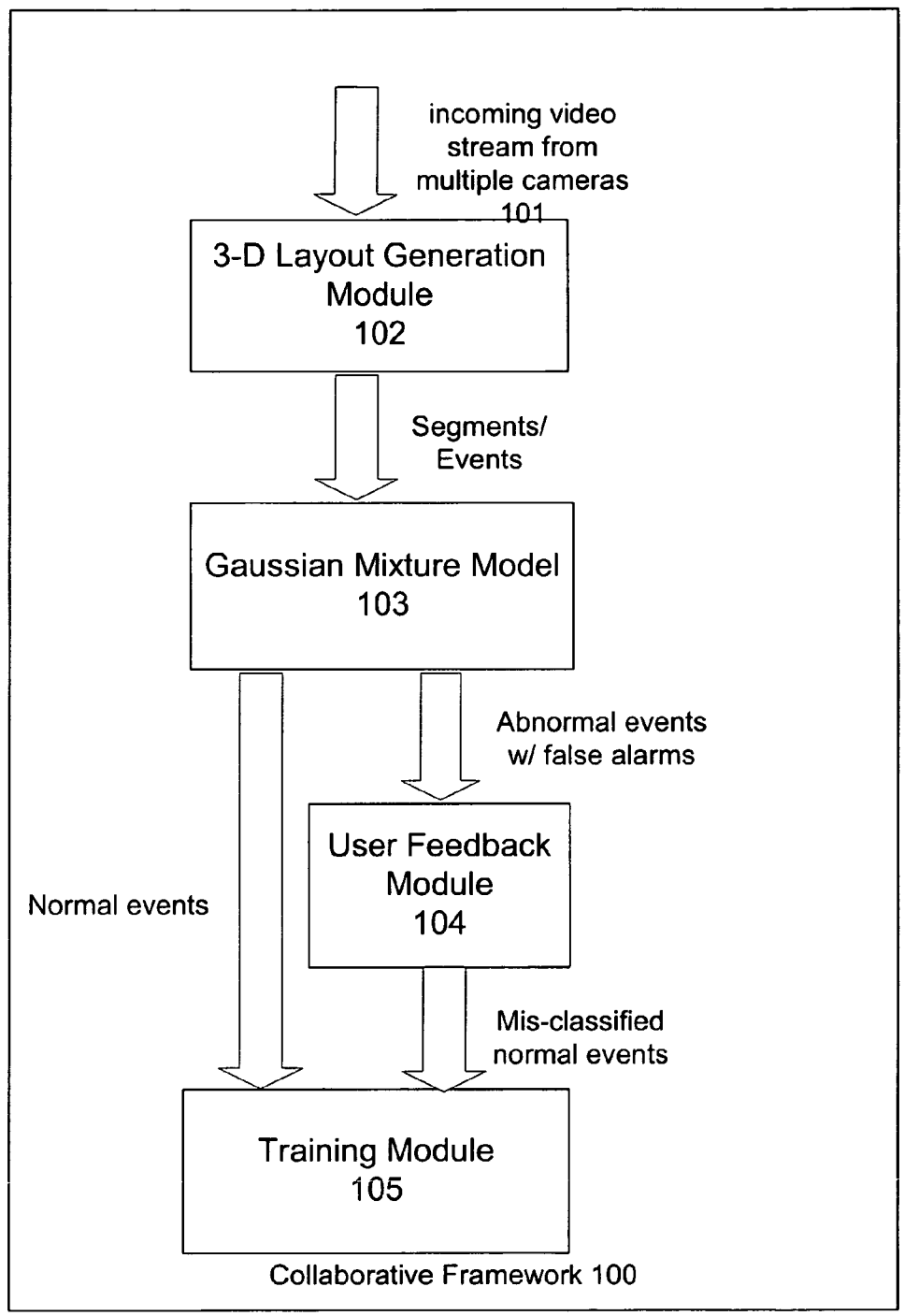
FIG. 1 is an illustration of an exemplary collaborative framework for mining of surveillance videos to detect abnormal events in one embodiment of the present invention.

FIG. 1 is an illustration of an exemplary collaborative framework 100 for mining of surveillance videos to detect abnormal events in one embodiment of the present invention. Although this diagram depicts components as functionally separate, such depiction is merely for illustrative purposes. It will be apparent to those skilled in the art that the components portrayed in this figure can be arbitrarily combined or divided into separate software, firmware and/or hardware components. Furthermore, it will also be apparent to those skilled in the art that such components, regardless of how they are combined or divided, can execute on the same computing device or multiple computing devices, and wherein the multiple computing devices can be connected by one or more networks.

Referring to FIG. 1, the central part of the collaborative framework is a training process, which is comprised of at least the following: a feature extraction and temporal segmentation module 102 is operable to segment the incoming video streams 101 from multiple cameras based on motion detection. For each segment/event, a probabilistic distribution of the location and size of the moving objects in the event is fit as a signature to represent the video segment and it can be parameterized and clustered via a Gaussian mixture model (GMM) 103. A model-based approach is used to train a classifier based on limited labeled training data for one class, i.e. the normal events, and abnormal events can then be defined as those segments that do not fit the model from the major clusters of all the normal events by its deviation from the normal event model. Abnormal events with false alarms are fed to user feedback module 104 to identify those mis-classified normal events and generate a clean training set. A training module 105, which can be a Hidden Markov Model (HMM) or a coupled Hidden Markov Model (CHMM), which generally outperform DTW on undivided time series, can then be trained by the clean training set based on the user feedback to suppress the high false alarm rate in the initial bootstrapping.

Figure 2:
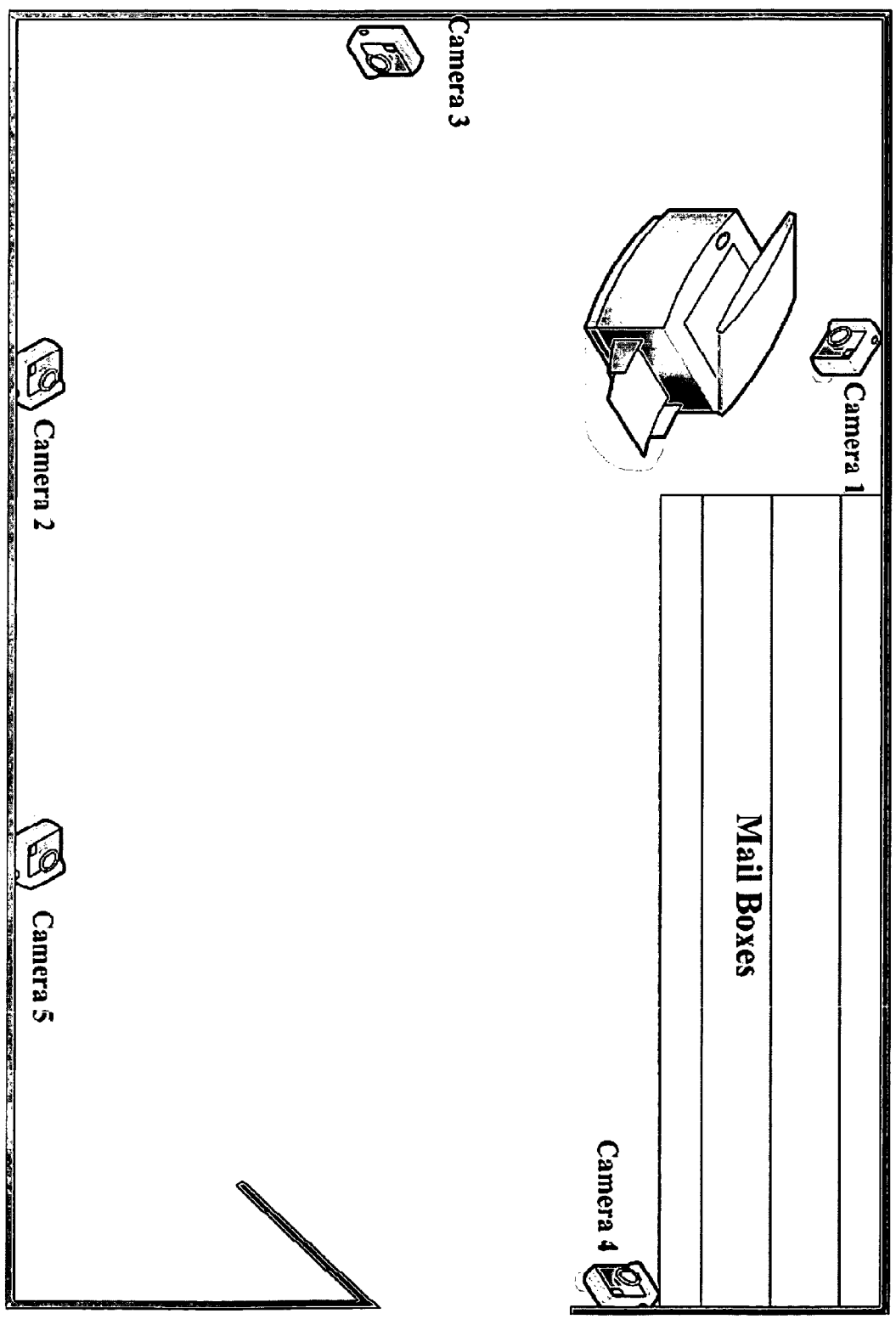
FIG. 2 is an exemplary setting for validating the collaborative framework in one embodiment of the present invention.

The framework is scalable and can be deployed to collaboratively detect abnormal events based on data from multiple surveillance systems. It can be used as an offline analysis tool as well as an online alarm trigger. For a non-limiting example, a floor plan of a mail room and the locations of the cameras are shown in FIG. 2. 7 days (56 hours) of synchronized video streams can be collected from 5 cameras mounted in the mail room to validate the framework.

Figure 3:
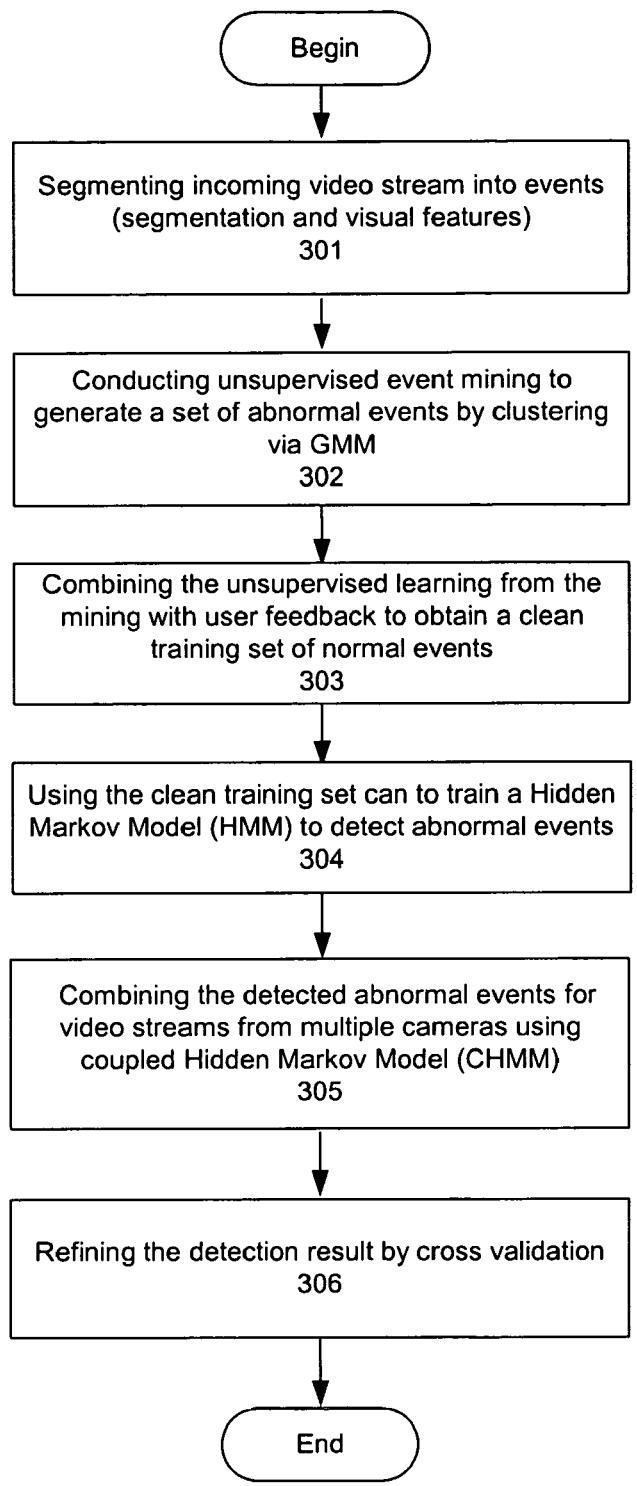
FIG. 3 is a flow chart illustrating an exemplary process of mining of surveillance videos to detect abnormal event in one embodiment of the present invention.

FIG. 3 is a flow chart illustrating an exemplary process of mining of surveillance videos to detect abnormal event in one embodiment of the present invention. Although this figure depicts functional steps in a particular order for purposes of illustration, the process is not limited to any particular order or arrangement of steps. One skilled in the art will appreciate that the various steps portrayed in this figure could be omitted, rearranged, combined and/or adapted in various ways.

Referring to FIG. 3, the incoming video stream is segmented into events (segmentations and visual features) at step 301, and unsupervised event mining is conducted to generate a set of abnormal events by clustering via GMM at step 302. Since GMM based event mining operates at a higher detection rate and thus higher false alarm rate, step 303 combines the generated set of abnormal events from unsupervised learning with user feedback to obtain a clean training set of normal events in order to bootstrap and accelerate the training process. The clean training set can then be used to train a HMM to detect abnormal events at step 304. For video streams from multiple cameras, coupled Hidden Markov Model (CHMM) can be used in place of HMM to combine the detected abnormal events at step 305. Finally, the detection result can be refined by cross validation at step 306.

Figure 4:
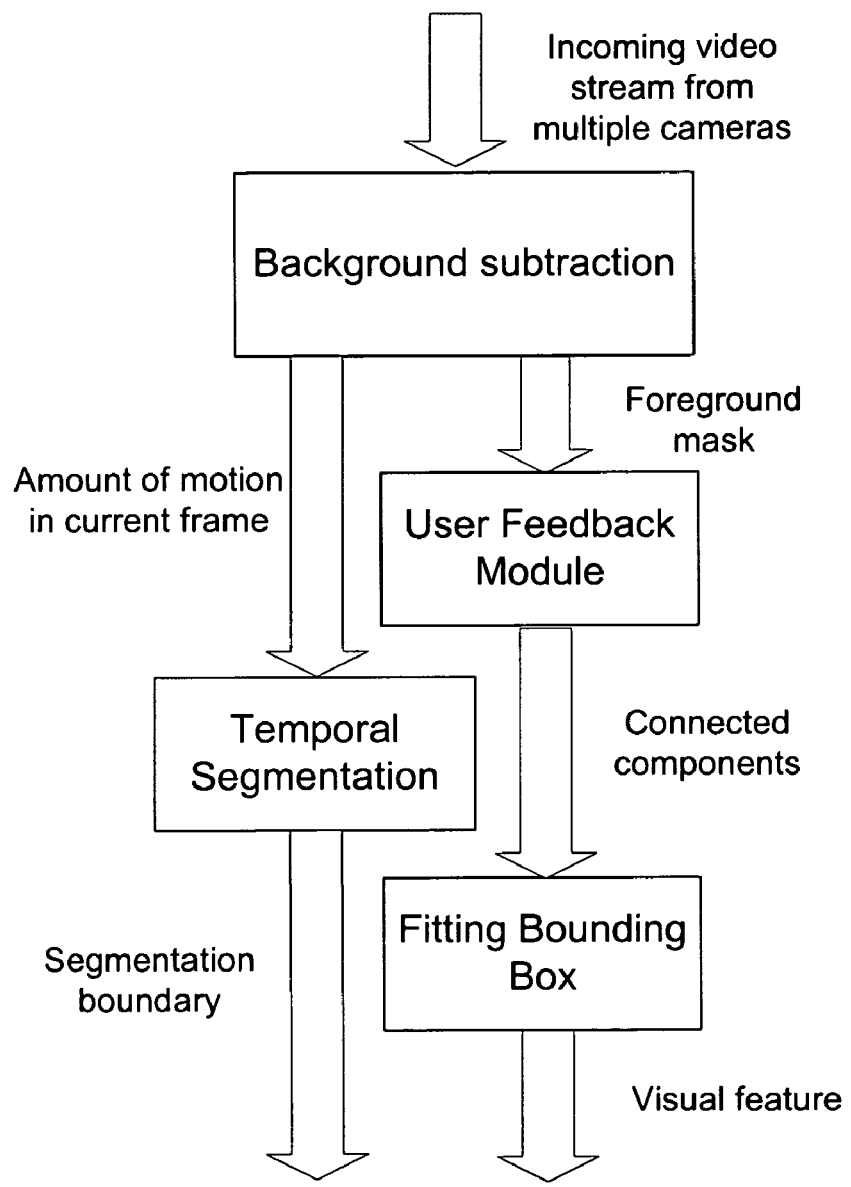
FIG. 4 is a flow chart illustrating an exemplary background subtraction process in one embodiment of the present invention.

In some embodiments, background subtraction method can be used for feature extraction and temporal segmentation to find the motion blobs in an input video stream and fit a bounding box around each blob. An event can then be defined as a sequence of frames where at least one blob is detected from one of the video streams. If there is no motion blob in a number of consecutive frames from all the cameras, it is determined to be the end of the last event. The exemplary flowchart of this temporal segmentation and visual feature extraction process is shown in FIG. 4.

In some embodiments, hierarchical clustering can be used to identify the major clusters based on the dissimilarity matrix for all pairs of signatures in the training set of events (segments). Since it is tedious to label a large number of normal events, unsupervised method can be used to find the clusters in the training data. The events for training can be clustered using approximate Kullback-Leibler (KL) divergence as the pair-wise dissimilarity measurement. Here, KL divergence is a natural distance measure from a "true" probability distribution P to an arbitrary probability distribution Q, where P typically represents data, observations, or a precise calculated probability distribution and the measure Q typically represents a theory, a model, a description or an approximation of P.

In some embodiments, fewer of those segments in the clusters can be marked as abnormal based on user feedback. No automatic method is free from making errors and the clustering approach described above is no exception. Once the events that have been filtered out as abnormal are examined, the false alarms can be manually labeled, and the false alarm segments can be put back into the clean training set for the normal event. This will help fine-tune the boundary between normal and abnormal events as human intervention is critical in imposing semantic meaning in event mining.

In some embodiments, several Hidden Markov Models (HMM) can be trained for abnormal event detection given that the training set containing only normal events and the best model can be selected according to the Minimum Description Length (MDL) principle. Here, HMM is a statistical model where the system being modeled is assumed to be a Markov process with unknown parameters, and the challenge is to determine the hidden parameters from the observable parameters. The extracted model parameters can then be used to perform further analysis. Unlike a regular Markov model, the state is not directly visible in a HMM, but variables influenced by the state are visible. Each state has a probability distribution over the possible output tokens. Thus the sequence of tokens generated by an HMM gives some information about the sequence of states. MDL principle states that the best hypothesis for a given set of data is the one that leads to the largest compression of the data, i.e. to describe it using fewer symbols than needed to describe the data literally.

In some embodiments, GMM, which models a probability density function (PDF) as a sum of parameterized functions, is used to train the HMM by parameterizing the PDF of the observation vectors, each of which consists of the location and size of the three largest bounding boxes detected in the image. It is assumed that the components in the vector are independent and thus the covariance matrix is diagonal. For a non-limiting example, 408 segments of lengths ranging from 20 to 300 frames can be extracted from 56 hours of video of the mailroom shown in FIG. 2, and used to train HMM of 3 to 8 states, with observation PDF parameterized with GMM of 2 to 9 kernels. A 4-state HMM of 6 kernel GMM observation PDF can be chosen as the model for normal events based on the MDL principle, because it reaches a balance between model complexity and overall likelihood of generating the training set.

In some embodiments, CHMM can be trained for normal events, wherein CHMM is widely used to analyze multiple streams of intrinsically related data flows. Visual features can be extracted and the likelihood of this event being generated from the CHMM for the normal events can be evaluated with Forward-Backward algorithm in order to classify a test segment into a normal event or an abnormal event. If likelihood is lower than a threshold, the event is classified as abnormal.

Again for the non-limiting example of FIG. 2, the framework detects, among the 408 segments, 20 abnormal segments corresponding to events that include, but are not limited to, someone fumbling with more than one person's mailboxes, someone opening the copy machine, or someone trying to tamper with the surveillance cameras. The longer sequences tend to have lower likelihood of being generated from the pre-trained normal event model because most normal events have shorter durations (therefore fewer frames) in the segment. These results can be obtained through a systematic data driven approach instead of manually setting an arbitrary threshold for the duration. The advantage is that both location of the motion as well as duration of the event are taken into consideration during the event detection.

One embodiment may be implemented using a conventional general purpose or a specialized digital computer or microprocessor(s) programmed according to the teachings of the present disclosure, as will be apparent to those skilled in the computer art. Appropriate software coding can readily be prepared by skilled programmers based on the teachings of the present disclosure, as will be apparent to those skilled in the software art. The invention may also be implemented by the preparation of integrated circuits or by interconnecting an appropriate network of conventional component circuits, as will be readily apparent to those skilled in the art.

One embodiment includes a computer program product which is a machine readable medium (media) having instructions stored thereon/in which can be used to program one or more computing devices to perform any of the features presented herein. The machine readable medium can include, but is not limited to, one or more types of disks including floppy disks, optical discs, DVD, CD-ROMs, micro drive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data. Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, execution environments/containers, and applications.

The foregoing description of the preferred embodiments of the present invention has been provided for the purposes of illustration and description. It is not intended to be exhaustive or to limit the invention to the precise forms disclosed. Many modifications and variations will be apparent to the practitioner skilled in the art. Particularly, while the concept "module" is used in the embodiments of the systems and methods described above, it will be evident that such concept can be interchangeably used with equivalent concepts such as, component, bean, class, method, type, interface, object model, and other suitable concepts. Embodiments were chosen and described in order to best describe the principles of the invention and its practical application, thereby enabling others skilled in the art to understand the invention, the various embodiments and with various modifications that are suited to the particular use contemplated. It is intended that the scope of the invention be defined by the following claims and their equivalents.

What is claimed is:

1. A system to support a collaborative framework or mining of surveillance videos, comprising: one or more processors; and memory storing one or more programs for execution by the one or more processors, the one or more programs including: a feature extraction and temporal segmentation module operable to segment one or more incoming video streams from multiple cameras into a plurality of events; a Gaussian mixture model (GMM) operable to generate a set of abnormal events via unsupervised mining of the plurality of events, including identifying clusters of the plurality of events via hierarchical clustering; a user feedback module operable to receive user feedback in process to identify mis-classified normal events in the set of abnormal events and generate a clean training set by combining the user feedback with the set of abnormal events: and a training model operable to perform motion detection on the one or more incoming video streams.

2. The system according to claim 1, wherein:
each of the plurality of events comprises a plurality of segmentations and visual features.

3. The system according to claim 1, wherein:
each of the set of abnormal events is a segment that does not fit a model of the normal events by its deviation from the model.

4. The system according to claim 1, wherein:
the feature extraction and temporal segmentation module is operable to perform background subtraction on the one or more video streams.

5. The system according to claim 1, wherein:
the Gaussian mixture model is operable to parameterize and cluster each of the plurality of events.

6. The system according to claim 1, wherein:
the training module is one of a Hidden Markov Model (HMM) and a coupled Hidden Markov Model (CHMM).

7. The system according to claim 6, wherein:
the HMM and/or CHMM is trained by the clean training set of events.

8. The system according to claim 6, wherein:
the HMM is trained by parameterizing a probability density function (PDF) of the observation vectors as a sum of parameterized functions.

9. The system according to claim 6, wherein:
CHMM is operable to combine motion detection results from multiple of the one or more incoming video streams.

10. A method to support mining of surveillance videos to detect abnormal event, performed by a computer system having one or more processors and memory storing one or more programs for execution by the one or more processors, the method comprising: segmenting one or more incoming video streams into a plurality of events; generating a set of abnormal events by clustering the plurality of events via unsupervised mining, including identifying clusters of the plurality of events via hierarchical clustering; receiving user feedback in process to identify misclassified normal events in the set of abnormal events; combining the set of abnormal events with the user feedback to obtain a clean training set of normal events; training a module for motion detection of abnormal events using the clean training set; and refining the motion detection result by the module via cross-validation.

11. The method according to claim 10, further comprising:
using background subtraction for feature extraction and temporal segmentation of the one or more video streams.

12. The method according to claim 10, further comprising:
parameterizing and clustering the plurality of events using a Gaussian mixture model (GMM).

13. The method according to claim 10, further comprising:
identifying major clusters based on the dissimilarity matrix for all pairs of signatures in the training set of events via hierarchical clustering.

14. The method according to claim 10, further comprising:
clustering the training set of events by using approximate Kullback-Leibler (KL) divergence as the pair-wise dissimilarity measurement.

15. The method according to claim 10, further comprising:
training one or more Hidden Markov Models (HMM) for motion detection of abnormal events.

16. The method according to claim 15, further comprising:
selecting the best model according to the Minimum Description Length (MDL) principle.

17. The method according to claim 10, further comprising:
training the one or more HMMs by parameterizing a probability density function (PDF) of the observation vectors as a sum of parameterized functions.

18. The method according to claim 10, further comprising:
combining motion detection results from multiple of the one or more incoming video streams via coupled Hidden Markov Model (CHMM).

19. A non-transitory machine readable medium storing instructions for execution by one or more processors of a computer system, the instructions comprising instructions to:

segment one or more incoming video streams into a plurality of events; generate a set of abnormal events by clustering the plurality of events via unsupervised mining, including identifying clusters of the plurality of events via hierarchical clustering; receive user feedback in process to identify misclassified normal events in the set of abnormal events; combine the set of abnormal events with the user feedback to obtain a clean training set of normal events; train a module for motion detection of abnormal events using the clean training set; and refine the motion detection result by the module via cross-validation.

20. A system to support collaborative framework for mining of surveillance videos, comprising: means for segmenting one or more incoming video streams into a plurality of events; means for generating a set of abnormal events by clustering the plurality of events via unsupervised mining, including identifying clusters of the plurality of events via hierarchical clustering; means for receiving user feedback in process to identify misclassified normal events in the set of abnormal events; means for combining the set of abnormal events with the user feedback to obtain a clean training set of normal events; means for training a module for motion detection of abnormal events using the clean training set; and means for refining the motion detection result by the module via cross-validation.

* * * * *